United States Patent [19]

Esposito

[11] 3,972,377

[45] Aug. 3, 1976

[54] AUTOMATIC SHUT-OFF DEVICE FOR FLUID DISPENSING FAUCET

[76] Inventor: Angelo Esposito, 217 N. Santa Cruz Ave., Los Gatos, Calif. 95030

[22] Filed: Feb. 27, 1975

[21] Appl. No.: 553,820

[52] U.S. Cl. .................................. 177/117; 141/362

[51] Int. Cl.[2] .......................................... G01G 13/02

[58] Field of Search ............ 177/117; 141/195, 278, 141/359, 373, 83, 360, 362

[56] References Cited

UNITED STATES PATENTS

| | | | |
|---|---|---|---|
| 2,066,169 | 12/1936 | Zwosta | 141/359 X |
| 2,610,019 | 9/1952 | Beall | 177/117 |
| 3,016,929 | 1/1962 | Rapaport | 141/359 X |
| 3,580,304 | 5/1971 | Chermack | 141/359 X |

*Primary Examiner*—Robert B. Reeves
*Assistant Examiner*—Frederick R. Handren
*Attorney, Agent, or Firm*—Gerald L. Moore

[57] ABSTRACT

A device for use with a restaurant faucet of the type which is turned on with the positioning of a pitcher for receiving water, which device shifts the pitcher when full to one side for shutting off the faucet.

1 Claim, 3 Drawing Figures

AUTOMATIC SHUT-OFF DEVICE FOR FLUID DISPENSING FAUCET

BACKGROUND OF THE INVENTION

In most restaurants for filling water pitchers, there is located a faucet extending vertically above a counter which utilizes a pitcher-actuated lever for turning on the water. In other words when the pitcher is placed into position for receiving water, it moves the lever to one side so that water is permitted to flow from the faucet. The attendant must watch the pitcher and when it is full remove it from the position adjacent the faucet, which action permits the spring-loaded lever to move to the closed position. Thus the water stops flowing from the faucet as the pitcher is removed.

However, if the atendant fails to remove the pitcher, the water keeps flowing even though the pitcher is full and of course, the water overflows into a receiving basin. Thus the waitress or other person must continually watch the pitcher to guard against overfilling. In addition such overfilling results in the pitcher outside surface becoming wet and thereby requiring that it be wiped off before use at the eating tables, et cetera.

In the past, various attempts have been made to provide automatic filler devices which would sense in some manner the full condition of a container fluid and thereafter shut off the flow from the faucet. However, usually such devices have been rather complicated and therefore expensive to purchase. Also, most prior art devices have required a special installation of equipment and apparatus requiring the removal of existing fountain devices. Naturally such requirements are expensive and time-consuming, not to mention the need for continued maintenance on the more complicated devices. It is the primary purpose of this invention to provide an automatic shut-off device for a fountain type faucet which can be utilized with the present facilities and which is simple in operation.

SUMMARY OF THE INVENTION

An automatic shut-off device for a fluid-dispensing apparatus of the type that includes a lever which is actuated by placement of the container in position to receive fluid, comprising a platform for receiving the container and means acting responsive to the weight of a container full of fluid for shifting the container to one side, thereby shutting off the faucet valve and stopping the flow of fluid.

DESCRIPTION OF THE INVENTION

Figure 1:
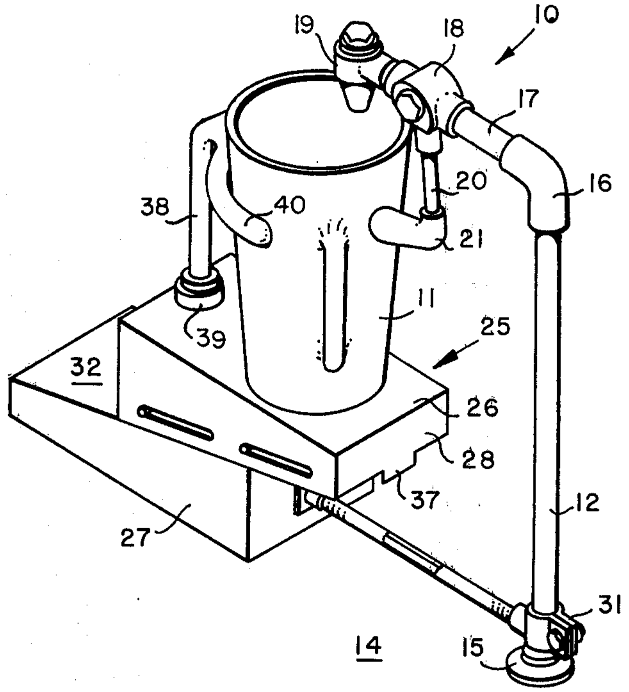
FIG. 1 is a perspective view showing the invention with a pitcher in place for receiving water from the faucet.

In the drawings is shown a standard faucet 10 frequently employed in such locations as restaurants or fountains for the purpose of filling a water pitcher 11, which the waitresses in turn can use to fill water glasses at the tables. Such a faucet usually comprises an upwardly extending water pipe 12, fixed to a counter top 14 by a flange 15 and extending to an elbow 16. Thereafter a horizontal section 17 fixed between the elbow includes a faucet valve 18 which controls the flow of fluid or liquid through the faucet mouth 19.

The faucet valve 18 usually comprises a spring-loaded or gravity-operated faucet lever 20 extending downward from the faucet valve and including an arm 21 which when shifted to one side in the direction of the arrow 22 turns on the faucet valve to allow water to flow through the faucet mouth 19. In the usual case the pitcher is set on the counter surface 14 and pushed into contact with the member 21 to turn on the water such that it will flow from the faucet head 19 into the pitcher. The attendant stands nearby to observe the pitcher and remove it from that position when it is full. With the removal of the pitcher, the arm 21 swings back down to the vertical position thereby shutting off the faucet valve 18. If the pitcher is not removed, the water will continue to flow from the faucet and overflow the pitcher.

In accordance with the present invention there is provided a device 25 on which the pitcher can be set for filling. This device includes a platform or top member 28 having an upper surface 26 on which the empty pitcher rests in the normal position for filling. The purpose of this device is to permit the positioning of an empty pitcher in the position for filling such that the faucet lever is shifted to one side to open the faucet valve. However, with the pitcher being filled to a desired level and therefore to a predetermined weight, the device will shift the pitcher to a position which allows the closing of the faucet valve.

For these purposes, the device comprises a base member 27 and a top member 28. The base member can be fixed in position as shown, partially offset from beneath the faucet in the direction the pitcher must be shifted for closing the faucet valve. This base member is held in position by an adjustable bracket 29 fixed to the side of the base by a flange 30 and extending to a clamp 31 fixed to the pipe 12. The bracket is adjustable to allow shifting of the position of the base member for centering the pitcher thereon relative to the faucet.

The top surface 32 of the base member preferably is flat and slanted at approximately a 15° angle or more in a direction extending away from the faucet. Fixed on this top surface is the top member 28 which includes a horizontal top surface 26 on which the pitcher rests. The contacting surfaces of the top member 28 and the base member 27 are parallel and extend at an angle to the top member surface 32 such that the top member tends to slide down the surface 32 of the base member.

The top member 28 is at least partially hollow and includes a plurality of slots 34 in the sidewall thereof through which the bolts 35 extend from a bracket 36 fixed to the top surface 32 of the base member. Thus the top member is permitted to move laterally between first and second positions in a direction towards and away from the faucet pipe 12 with a flange 37 provided to stop lateral movement thereof in the direction away from the faucet. In the embodiment shown the actual surfaces of the top and base members which contact are preferably the edges of the slots 34 and the bolts 35 to limit friction between the members but such contacting surfaces could also include the parallel top and bottom surfaces respectively of the base and top members. Extending from the top surface 26 of this top member is a stanchion 38 held at the bottom by a bracket 39 and extending up to a horizontal yoke member 40 configured to fit loosely around the pitcher near the top. This stanchion serves as supporting means to brace the pitcher against tipping during movement thereof in a manner to be explained later. A biasing means or spring 41 internal to and fixed to the top member and having one end attached to the base biases the top member to the righthand position in FIG. 2. Thus the top member and supported pitcher would normally rest in the second position with the pitcher out of contact with the lever arm 21 but the spring holds the top member and pitcher when empty in the first position.

Figure 2:
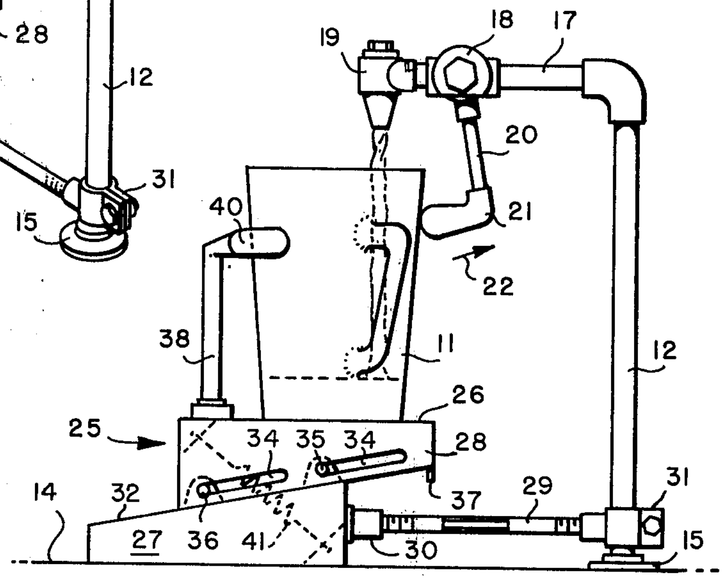
FIG. 2 is a side view showing the pitcher in place and being filled with water.
Figure 3:
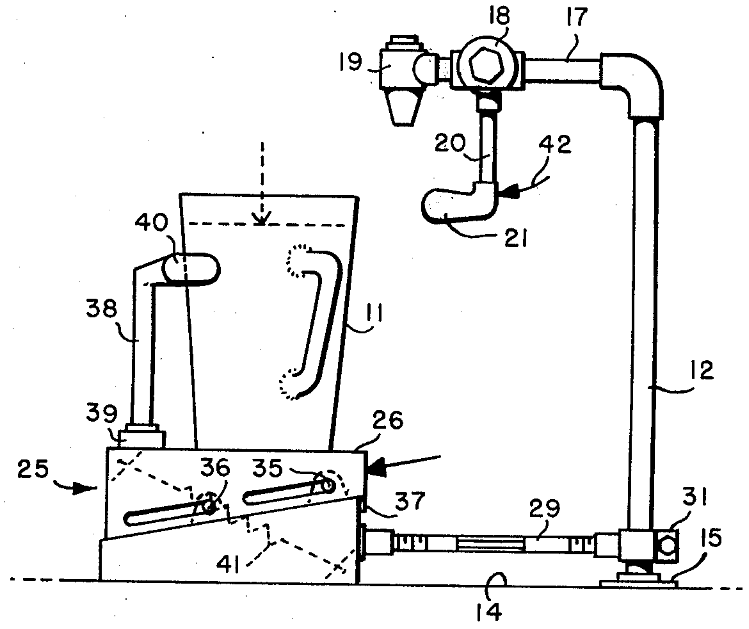
FIG. 3 shows the full pitcher shifted to one side after being filled.

In operation, the attendant places the pitcher in the position shown in FIGS. 1 and 2 so that it abuts and shifts the lever member 21 in the direction of the arrow 22 and turns on the faucet 18. It may be that the stanchion 38 can be grasped and pulled in a direction away from the faucet slightly for positioning the pitcher in place beneath the faucet mouth. As a result of the faucet being turned on, water flows into the pitcher as shown in FIG. 2 until it reaches the approximate level indicated by the dotted line in FIG. 3. At that time the weight of the pitcher plus the weight of the top member overcomes the biasing force of the spring 41 which yields and allows the top member to shift from the righthand position shown in FIG. 2 to the lefthand position shown in FIG. 3. Such movement of the pitcher permits the lever 20 to swing to the left or closed position as indicated by the arrow 42 thereby closing the faucet prior to the pitcher moving out of position beneath the faucet head. The top member shifts until the stop 37 encounters the base member at which position the movement ceases and the pitcher remains in the position shown in FIG. 3. The stanchion 38 prevents tipping of the pitcher when the sidewise motion stops.

Thus it can be seen that there is provided a device for automatically shutting off the faucet when the pitcher is full which device can be incorporated with existing faucet installations with only a minimum effort. In the usual instance there is sufficient clearance for the additional height necessary for the device, however, if not it is an easy matter to insert a longer upright pipe 12 to provide an additional length.

I claim:

1. An automatic shut-off device for a fluid dispensing faucet of the type that includes a lever which is moved to one side by a container placed in position to receive fluid from the faucet with the lever movement causing fluid to flow from the faucet, said device comprising:

a platform positioned in a first position to hold the container in position to receive fluid from the faucet;

a base member supporting said platform, said platform and base member having abutting surfaces extending in a plane at an angle to the platform surface such that downward pressure on the platform will cause movement thereof relative to the base member in a direction away from the faucet;

spring means biasing the platform to the first position such that a container abuts the lever, said spring means being operable to allow movement of the platform to a second position spaced from the faucet when the container is filled with fluid for moving the container away from the lever;

means attaching the base member to the faucet to prevent relative movement therebetween whereby an empty container can be placed on the platform in the first position to move the lever and cause the faucet to dispense fluid into the container and when the container is full, the platform and container will move to the second position and shut off the flow of fluid from the faucet.

* * * * *